United States Patent Office 3,305,275
Patented Feb. 21, 1967

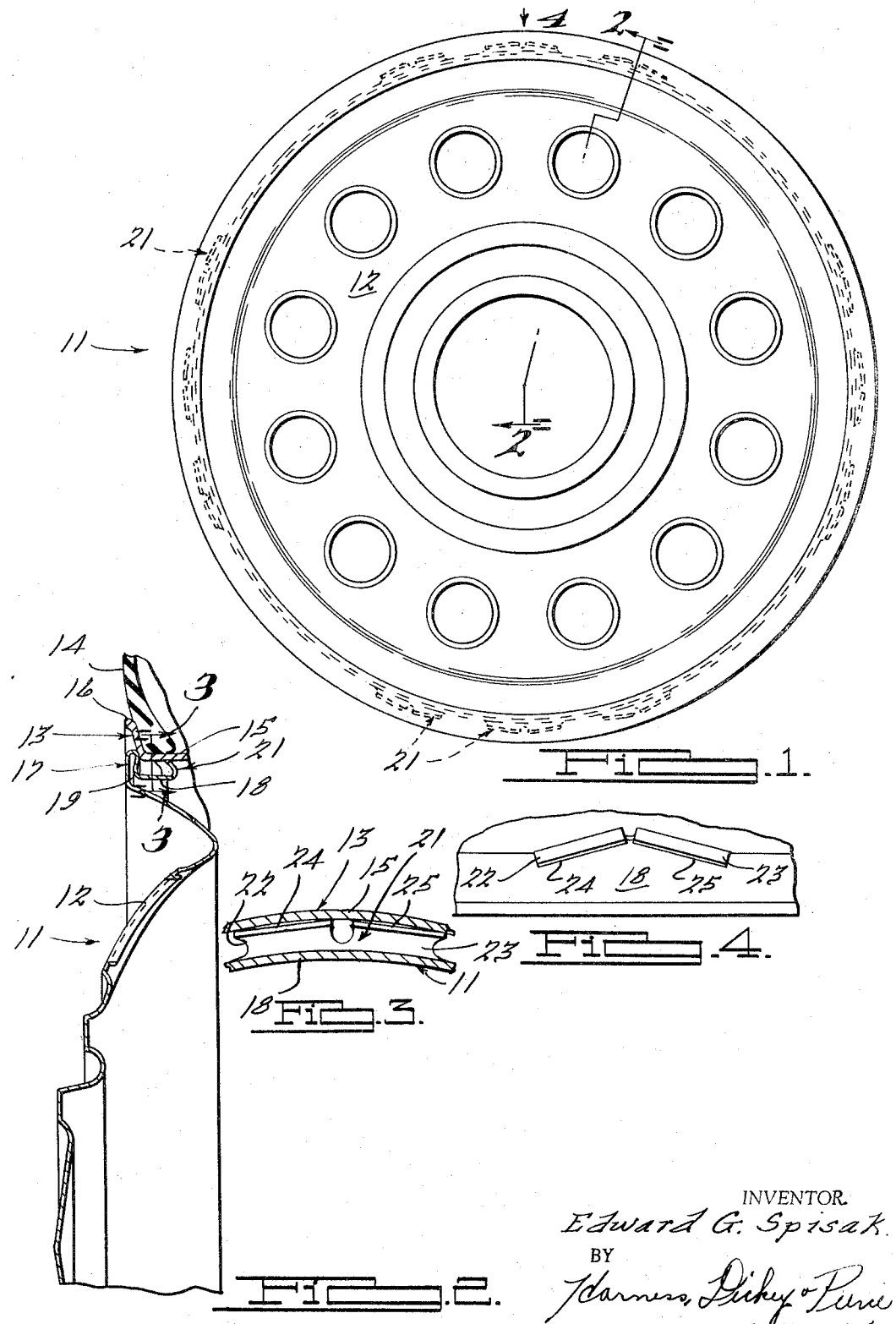

3,305,275
WHEEL COVER
Edward G. Spisak, Wayne, Mich., assignor to Gar Wood Industries, Inc., a corporation of Michigan
Filed June 25, 1965, Ser. No. 466,978
1 Claim. (Cl. 301—37)

This invention relates generally to decorative covers for the wheels of motor vehicles and more particularly to an improved means for retaining such wheel covers on the vehicle wheels.

Decorative covers for the wheels of a motor vehicle must satisfy a pair of seemingly irreconcilable requirements, namely, that they be positively engageable with the vehicle wheels, yet be readily removable therefrom to provide access to the outer face of the wheels. These diverse requirements are best satisfied by a wheel cover that is resiliently engageable with the vehicle wheel so as to be capable of absorbing road shocks, vibrations and wheel deformation, yet be relatively easily removable from the face of the vehicle wheel under the bias of, for example, a tire tool.

A wheel cover provided with the retaining means of the present invention exhibits an improved holding power on a vehicle wheel as compared to wheel covers heretofore known and used. Yet, a wheel cover having the herein disclosed cover retaining means is relatively easily applied to and removable from the vehicle wheel thereby to satisfy the foregoing requirements to a heretofore unknown degree. The retaining means of the wheel cover is also relatively simple in configuration so as to maximize manufacturing economy.

A wheel cover embodying the instant invention is adapted to be applied to the frontal face of a vehicle wheel having an annular, generally axially extending wheel flange. The wheel cover comprises an annular generally axially extending retaining flange having a plurality of circumferentially spaced retaining fingers extending therefrom and adapted to grippingly engage the wheel flange when the cover is positioned on the wheel. Each of the retaining fingers terminates in a pair of radially outwardly facing biting edge portions that extend in a generally chordal direction with respect to a circle that is concentric with and of greater diameter than the wheel flange so that the biting edge portions initially have point contact at each end thereof, respectively, with the wheel flange. The biting edge portions of the fingers are deflectible under the influence of radial forces thereon to increase the contact surface between the edge portions and the adjacent surface of the wheel flange to biting line contact. The edge portions are angularly related to each other and to a plane lying at a right angle to the control axis of the wheel cover thereby to preclude indexing of the cover and to facilitate assembly, as will be described.

Accordingly, one object of the present invention is a wheel cover that is relatively easily applied to and removed from the face of a vehicle wheel.

Another object of the invention is an improved retaining means for a wheel cover.

Another object is a retaining means for a wheel cover that is engageable with a vehicle wheel with increasing biting contact under the influence of radial loads to maximize the holding power of the wheel cover on the vehicle wheel under road conditions.

Other objects and advantages of the present invention will become apparent from the following detailed description, claim and drawings, wherein:

FIGURE 1 is a side elevational view of the outer face of the wheel cover embodying this invention;

FIGURE 2 is a cross-sectional view taken along the line 2—2 in FIGURE 1 and showing the wheel cover positioned upon a vehicle wheel;

FIGURE 3 is a cross-sectional view taken substantially along the line 3—3 of FIGURE 2;

FIGURE 4 is a plan view taken in the direction of the arrow 4 shown in FIGURE 1.

Referring now in detail to the drawings, a wheel cover 11 embodying this invention has a generally circular shaped outer face 12 that is adapted to extend across the axially outer surface of a wheel, indicated generally by the reference numeral 13 in FIGURES 2 and 3. A tire 14 is supported upon the exterior of an annular, generally axially extending wheel flange 15 of the wheel 13 that terminates at its outer edge in a radially outwardly extending rim 16. The face 12 of the wheel cover 11 may be provided with any suitable ornamental design. It is to be understood that the terms "axially outwardly," "axially inwardly," and "radially" used hereinafter are relative terms used to orient the structural elements of the cover 11 and the wheel 13.

The outer periphery of the face 12 of the wheel cover 11 terminates in a radially outwardly extending flange 17 that is adapted to abut the rim 16 if the wheel cover 11 is a full cover. The flange 17 may be spaced radially inwardly from the rim 16 if a full cover is not desired. An annular generally axially extending retaining flange 18 is formed integrally with a radially inwardly extending portion 19 of the radial flange 17.

A plurality of retaining fingers 21 are formed integrally with the inner edge of the retaining flange 18, each of the retaining fingers 21 having at its outer periphery outturned portions 22 and 23 that terminate in edges 24 and 25, respectively. The edges 24 and 25 are normally straight lines disposed at an angle to each other and at an angle to a radial plane that is normal to the axis of the wheel 13, as best seen in FIGURE 4.

In the radial plane, the edges 24 and 25 extend in a chordal direction relative to a circle having a somewhat larger diameter than the inside diameter of the wheel flange 15, as best seen in FIGURE 3. The edges 24 and 25, therefore, will have initial point contact with the wheel flange 15 at each end thereof when the wheel cover 11 is inserted onto the wheel 13. It will additionally be noted that the initial point contacts of the edges 24 and 25 lie at different axial locations upon the wheel flange 15. This feature is important upon assembly of the wheel cover 11 with the wheel 13 since the axially inwardly disposed points are first engaged with the wheel flange 15 upon assembly tending to radially inwardly compress the retaining fingers and reduce the interference between the axially outer points and the wheel 13.

It is also important to note that while the edge portions 23 and 24 initially engage the wheel flange 15 in point contact, the portions 22 and 23 of the fingers 21 are resilient whereby the edge portions 24 and 25 will deform under the influence of radial loads thereon. The increase in the radial loading upon the edge portions 24 and 25 tends to increase the area of contact between the edge portions 24 and 25 and the wheel flange 15, and thus augment holding power in relation to loading. Under maximum loading, the edge portions 23 and 24 will assume the shape of a circle having the same diameter as the wheel flange 15. In other words, an increase in the loading upon the wheel cover 11 in a radial direction increases the contact area between the fingers 21 and the wheel flange 15 to preclude disengagement between the wheel cover 11 and the wheel 13.

The angular disposition of the edge portions 24 and 25 assists in insuring against indexing of the wheel cover 11 relative to the wheel 13. Because the edge portions 24 and 25 extend at an angle to the directions of rotation of the wheel 13, they tend to preclude indexing of the wheel cover 11 relative to the wheel 13.

The relatively simple form of the retaining fingers facilitates fabrication of the retaining means. The chordal and angular disposition of the gripping edges, however, locks the wheel cover to the wheel and resists relative movement under all normal loading conditions.

It is to be understood that the specific constructions for decorative wheel covers herein disclosed and described are presented for the purpose of explanation and illustration of the form the invention may take and is not intended to indicate limits of the invention, the scope of which is defined by the following claim.

What is claimed is:

A wheel structure including a vehicle wheel having an annular generally axially extending wheel flange, and
a wheel cover, said wheel cover comprising
an annular generally axially extending retaining flange,
a plurality of circumferentially spaced axially inwardly extending retaining fingers on said retaining flange terminating in axially and radially outwardly extending biting edge portions engageable with the wheel flange on said vehicle wheel when said cover is positioned thereon,
the edge portions on said retaining fingers extending generally parallel to the wheel flange axially thereof and in a chordal direction circumferentially thereof,
adjacent edge portions on said retaining fingers extending at an obtuse included angle relative to each other,
each of the edge portions extending at an acute included angle relative to a radial plane extending normal to the axis of the wheel,
opposite ends of said edge portions making biting engagement with the wheel flange at axially and circumferentially spaced locations thereupon.

References Cited by the Examiner

UNITED STATES PATENTS

| | | | |
|---|---|---|---|
| 2,683,629 | 7/1954 | Lyon | 301—37 |
| 2,732,262 | 1/1956 | Buerger | 301—37 |
| 2,921,815 | 1/1960 | Lyon | 301—37 |
| 2,933,348 | 4/1960 | Lyon | 301—37 |

BENJAMIN HERSH, *Primary Examiner.*

RICHARD J. JOHNSON, *Examiner.*